(12) United States Patent
Bak et al.

(10) Patent No.: US 11,719,156 B2
(45) Date of Patent: Aug. 8, 2023

(54) COMBINED POWER GENERATION SYSTEM WITH FEEDWATER FUEL PREHEATING ARRANGEMENT

(71) Applicant: DOOSAN ENERBILITY CO., LTD., Changwon-si (KR)

(72) Inventors: Byoung Gu Bak, Suwon (KR); Song Hun Cha, Osan (KR); Sung Gju Kang, Yongin (KR); Hong Geun Ha, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/677,006

(22) Filed: Feb. 22, 2022

(65) Prior Publication Data
US 2022/0316395 A1    Oct. 6, 2022

(30) Foreign Application Priority Data

Mar. 30, 2021    (KR) .................. 10-2021-0041385
Mar. 30, 2021    (KR) .................. 10-2021-0041386
(Continued)

(51) Int. Cl.
*F02C 6/18*    (2006.01)
*F02C 7/12*    (2006.01)
(Continued)

(52) U.S. Cl.
CPC ............... *F02C 6/18* (2013.01); *F01K 23/10* (2013.01); *F02C 7/12* (2013.01); *F02C 7/141* (2013.01); *F02C 7/224* (2013.01)

(58) Field of Classification Search
CPC .......... F01K 23/10; F01K 23/106; F02C 6/18; F02C 7/224
See application file for complete search history.

(56) References Cited

U.S. PATENT DOCUMENTS 6,269,626 B1 *  8/2001  Kim ..................... F02C 6/18
                                                      122/7 B
8,516,787 B2    7/2013  Oomens
                    (Continued)

FOREIGN PATENT DOCUMENTS

JP    2001214758 A    8/2001
JP    2003148166 A    5/2003
(Continued)

OTHER PUBLICATIONS

KR OA, dated Mar. 29, 2022.
KR OA, dated Apr. 1, 2022.

*Primary Examiner* — Alain Chau
(74) *Attorney, Agent, or Firm* — Harvest IP Law, LLP

(57) ABSTRACT

A combined power generation system is provided. The combined power generation system includes a gas turbine configured to combust fuel to generate a rotational force, a heat recovery steam generator (HRSG) configured to heat feedwater using combustion gas discharged from the gas turbine and include a high-pressure section, a medium-pressure section, and a low-pressure section with different pressure levels, a fuel preheater configured to heat the fuel supplied to the gas turbine and include a primary heating part and a secondary heating part, and a high-pressure feedwater supply pipe connected to the high-pressure section to supply high-pressure feedwater to the secondary heating part.

17 Claims, 8 Drawing Sheets

(30) Foreign Application Priority Data

Mar. 30, 2021 (KR) ........................ 10-2021-0041387
Mar. 30, 2021 (KR) ........................ 10-2021-0041388

(51) Int. Cl.
 *F02C 7/224* (2006.01)
 *F02C 7/141* (2006.01)
 *F01K 23/10* (2006.01)

(56) References Cited

U.S. PATENT DOCUMENTS

| | | | |
|---|---|---|---|
| 9,404,395 | B2 | 8/2016 | Feller |
| 9,903,276 | B2 | 2/2018 | Hotta |
| 10,006,313 | B2 * | 6/2018 | Drouvot ................ F02C 7/224 |
| 10,352,246 | B2 * | 7/2019 | Sumimura ............. F22D 1/14 |
| 10,900,418 | B2 * | 1/2021 | Selfridge ............... F02C 7/224 |
| 2004/0011019 | A1 | 1/2004 | Schöttler |
| 2013/0074508 | A1 * | 3/2013 | Sholes .................. F02C 6/003 60/772 |
| 2014/0116063 | A1 * | 5/2014 | Deng ..................... F01K 23/10 60/39.461 |
| 2015/0007575 | A1 * | 1/2015 | Drouvot ................ F02C 7/224 60/39.182 |
| 2015/0345401 | A1 * | 12/2015 | Ekanayake ............ F02C 7/08 60/785 |
| 2016/0003159 | A1 * | 1/2016 | Hotta .................... F02C 3/04 60/736 |
| 2017/0010176 | A1 * | 1/2017 | Inoue .................... F02C 7/224 |
| 2018/0363557 | A1 * | 12/2018 | Sumimura ............. F22D 1/14 |
| 2019/0093563 | A1 * | 3/2019 | Selfridge .............. F22D 5/28 |

FOREIGN PATENT DOCUMENTS

| | | | | |
|---|---|---|---|---|
| JP | 2004169696 | A | | 6/2004 |
| JP | 2007016791 | A | | 1/2007 |
| JP | 2016075177 | A | | 5/2016 |
| JP | 2016186240 | A * | 10/2016 | ............... F02C 7/08 |
| JP | 2016186240 | A | | 10/2016 |
| KR | 101594323 | B1 | | 2/2016 |
| KR | 1020190037131 | A | | 4/2019 |

\* cited by examiner

COMBINED POWER GENERATION SYSTEM WITH FEEDWATER FUEL PREHEATING ARRANGEMENT

CROSS REFERENCE TO RELATED APPLICATIONS

This application claims priority to Korean Patent Applications Nos. 10-2021-0041385, filed Mar. 30, 2021, 10-2021-0041386, filed Mar. 30, 2021, 10-2021-0041387, filed Mar. 30, 2021, and 10-2021-0041388, filed Mar. 30, 2021, the disclosures of which are incorporated herein by reference in their entireties.

BACKGROUND

1. Field

Apparatuses and methods consistent with exemplary embodiments relate to a combined power generation system and an operating method thereof, and more particularly, to a combined power generation system having a gas turbine and a fuel preheater, and an operating method thereof.

2. Description of the Related Art

A combined power generation system is a power generation system that combines a gas turbine and a steam turbine with high efficiency to guide high-temperature exhaust gas from the gas turbine to a heat recovery steam generator (HRSG) and to generate steam using thermal energy retained in the exhaust gas. This steam enables power generation by the steam turbine and can be combined with the power generated by the gas turbine to improve thermal efficiency equal to the thermal energy retained in the exhaust gas when compared to independent power production by the gas turbine.

A gas turbine is a power engine that mixes compressed air compressed in a compressor and fuel, burns an air-fuel mixture, and rotates a turbine with high-temperature combustion gas. Gas turbines are used to drive generators, aircrafts, ships, trains, and the like.

In order to improve the efficiency of the gas turbine, it is necessary to preheat the fuel flowing into the gas turbine. As the fuel is preheated to a high temperature, the temperature of the gas turbine increases. However, if the fuel is overheated, the fuel may be carbonized due to thermal decomposition during the preheating process.

SUMMARY

Aspects of one or more exemplary embodiments provide a combined power generation system capable of efficiently preheating fuel supplied to a gas turbine, and an operating method thereof.

Additional aspects will be set forth in part in the description which follows and, in part, will become apparent from the description, or may be learned by practice of the exemplary embodiments.

According to an aspect of an exemplary embodiment, there is provided a combined power generation system including: a gas turbine configured to combust fuel to generate a rotational force; a heat recovery steam generator (HRSG) configured to heat feedwater using combustion gas discharged from the gas turbine and include a high-pressure section, a medium-pressure section, and a low-pressure section with different pressure levels; a fuel preheater configured to heat fuel supplied to the gas turbine and include a primary heating part and a secondary heating part; and a high-pressure feedwater supply pipe connected to the high-pressure section to supply high-pressure feedwater to the fuel preheater.

The high-pressure feedwater supply pipe may be connected to the secondary heating part to supply the high-pressure feedwater to the secondary heating part.

The combined power generation system may further include a feedwater transfer pipe connecting the secondary heating part and the primary heating part to supply the feedwater discharged from the secondary heating part to the primary heating part.

The combined power generation system may further include: a feedwater control pipe connected to the medium-pressure section to supply medium-pressure feedwater to the feedwater transfer pipe; and an intermediate control valve installed between the primary heating part and the secondary heating part to control a flow rate of high-pressure feedwater flowing into the secondary heating part.

A medium-pressure control valve may be installed on the feedwater control pipe to control a flow rate of feedwater supplied from the feedwater control pipe to the feedwater transfer pipe.

The combined power generation system may further include: a bypass pipe connecting an upstream side of the primary heating part and a downstream side of the secondary heating part to supply fuel to the downstream side of the secondary heating part while bypassing the primary heating part and the secondary heating part.

The combined power generation system may further include: a bypass pipe connecting an upstream side of the primary heating part and an upstream side of the secondary heating part to supply fuel to the secondary heating part while bypassing the primary heating part.

The combined power generation system may further includes: a feedwater temperature control pipe connected to a downstream side of the medium-pressure feedwater pump of the medium-pressure section to supply first medium-pressure feedwater to the feedwater transfer pipe; and a feedwater pressure control pipe connected to the medium-pressure section to supply second medium-pressure feedwater to the feedwater transfer pipe, the second medium-pressure feedwater having a higher temperature than that of the first medium-pressure feedwater.

The medium-pressure section may include a medium-pressure pump pressurizing and supplying the feedwater, a medium-pressure economizer receiving the feedwater from the medium-pressure pump and heating the received feedwater, and a medium-pressure drum storing the feedwater heated in the medium-pressure economizer, and the feedwater temperature control pipe may be connected between the medium-pressure pump and the medium-pressure economizer to receive the feedwater from the medium-pressure pump.

The feedwater pressure control pipe may be connected between the medium-pressure economizer and the medium-pressure drum to receive the feedwater heated in the medium-pressure economizer.

The feedwater of the feedwater pressure control pipe may be supplied in opposite directions, and the pressure of the feedwater transfer pipe may be controlled to be equal to the upstream side pressure of the medium-pressure drum by the feedwater pressure control pipe.

The primary heating part and the secondary heating part may be disposed in parallel.

The combined power generation system may further include: a first branch pipe connected to the high-pressure feedwater supply pipe to supply the feedwater to the primary heating part; and a second branch pipe connected to the high-pressure feedwater supply pipe to supply the feedwater to the secondary heating part.

The combined power generation system may further include: a first bypass pipe connecting an upstream side of the primary heating part and a downstream side of the primary heating part to supply fuel while bypassing the primary heating part; and a first fuel control valve controlling a flow rate of the fuel flowing through the first bypass pipe.

The combined power generation system may further include: a second bypass pipe connecting an upstream side of the secondary heating part and a downstream side of the secondary heating part to supply fuel while bypassing the secondary heating part; and a second fuel control valve controlling a flow rate of the fuel flowing through the second bypass pipe.

The fuel preheater may further include a preheater connected to a feedwater return pipe to receive the feedwater discharged from the primary heating part and the secondary heating part to preheat the fuel, the fuel heated in the preheater may be divided and supplied to the primary heating part and the secondary heating part.

The combined power generation system may further include a feedwater control pipe to supply the feedwater from the medium-pressure section to the preheater.

According to an aspect of another exemplary embodiment, there is provided a combined power generation system including: a gas turbine including a compressor configured to compress air, a combustor configured to combust fuel, and a main turbine configured to rotate turbine blades using combustion gas discharged from the combustor; a heat recovery steam generator (HRSG) configured to heat feedwater using the combustion gas discharged from the gas turbine and include a high-pressure section, a medium-pressure section, and a low-pressure section with different pressure levels; a cooler configured to cool the compressed air generated by the compressor with feedwater supplied from the HRSG and include a first cooling heat exchanger and a second cooling heat exchanger; a feedwater supply pipe connected to the HRSG to supply feedwater to the first cooling heat exchanger; a feedwater transfer pipe connecting the first cooling heat exchanger and the second cooling heat exchanger to supply feedwater discharged from the first cooling heat exchanger to the second cooling heat exchanger; a steam return pipe supplying the feedwater heated in the second cooling heat exchanger to the HRSG; and a cooling air discharge pipe supplying the air cooled by the cooler to a heat source of the gas turbine.

The second cooling heat exchanger may be configured as a kettle boiler to store and discharge vaporized steam.

The second cooling heat exchanger may include a plurality of tubes through which hot air flows, an air inlet through which air is introduced, an air outlet through which heated air is discharged, a feedwater inlet through which feedwater is introduced, and a steam outlet through which steam is discharged.

The combined power generation system according to one or more exemplary embodiments, feed water from the high pressure side can be supplied to the fuel preheater to supply sufficient heat to the fuel, and the temperature of the feed water can be controlled by feed water from the middle pressure side to prevent overheating of the fuel.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
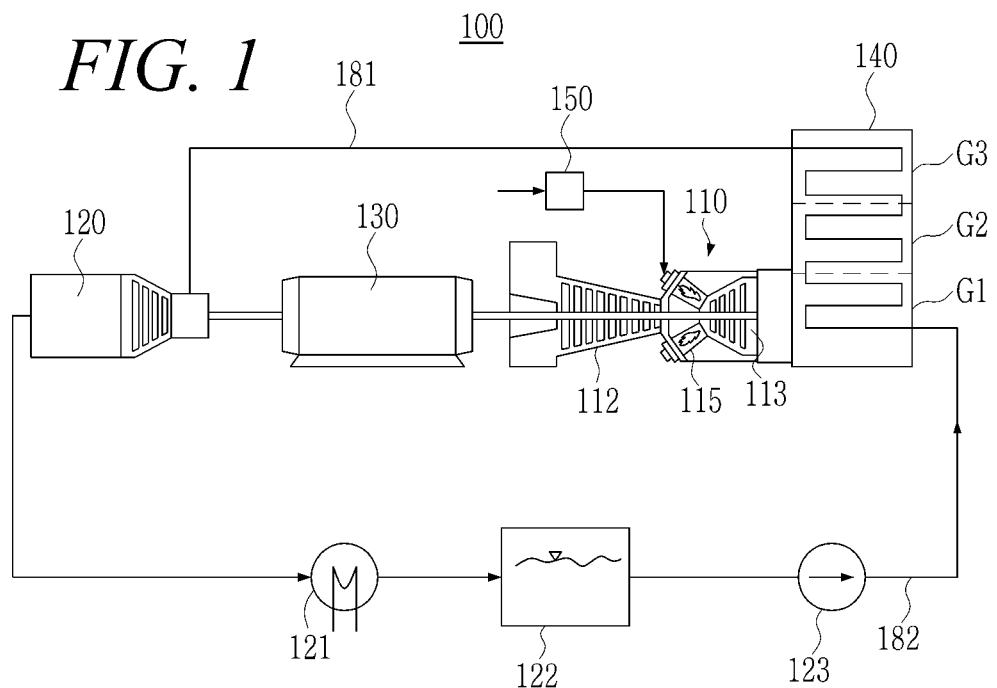
FIG. 1 is a block diagram illustrating a combined power generation system according to a first exemplary embodiment.

Various modifications and various embodiments will be described below in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Terms used herein are used to describe specific embodiments only and are not intended to limit the scope of the disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, exemplary embodiments will be described in detail with reference to the accompanying drawings. It is noted that like reference numerals refer to like elements throughout the different drawings and exemplary embodiments. In certain embodiments, a detailed description of known functions and configurations that may obscure the gist of the disclosure will be omitted. For the same reason, some of the elements in the drawings are exaggerated, omitted, or schematically illustrated.

Figure 2:
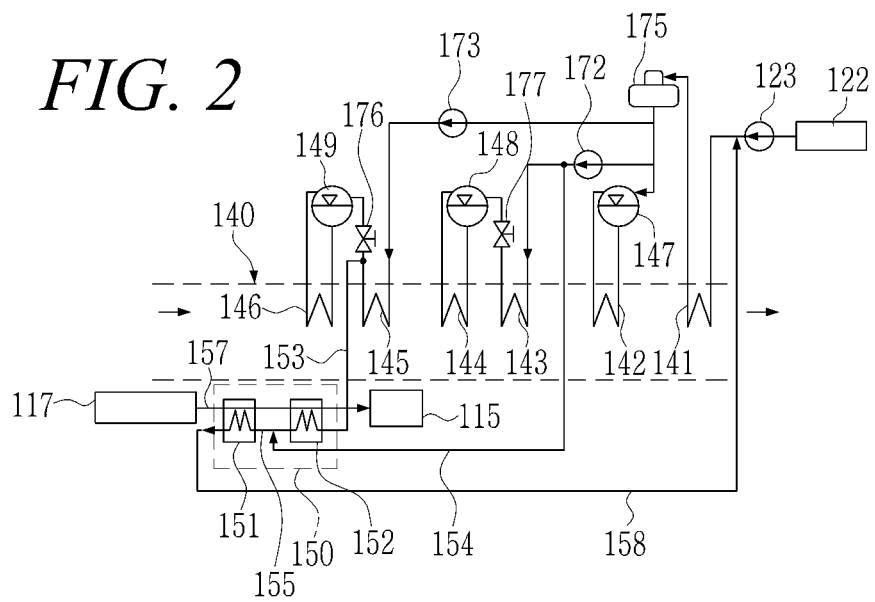
FIG. 2 is a block diagram illustrating a fuel preheater according to the first exemplary embodiment and a heat recovery steam generator (HRSG)
Figure 3:
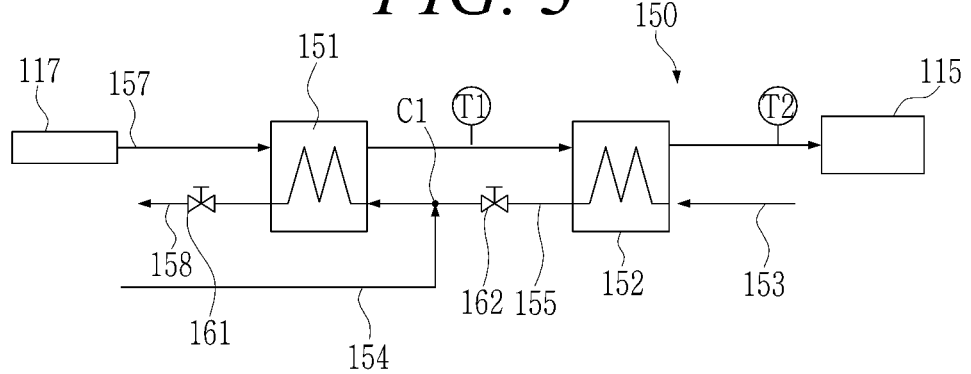
FIG. 3 is a diagram illustrating a configuration of the fuel preheater according to the first exemplary embodiment.

FIG. 1 is a block diagram illustrating a combined power generation system according to a first exemplary embodiment, FIG. 2 is a block diagram illustrating a fuel preheater according to the first exemplary embodiment and a heat recovery steam generator (HRSG), and FIG. 3 is a diagram illustrating a configuration of the fuel preheater according to the first exemplary embodiment.

Referring to FIGS. 1 to 3, a combined power generation system 100 includes a plurality of turbines to generate electric power. The combined power system 100 includes a gas turbine 110, a generator 130, a heat recovery steam generator (HRSG) 140, a steam turbine 120, a fuel preheater 150, a high-pressure feedwater supply pipe 153, a feedwater transfer pipe 155, a feedwater control pipe 154, a downstream control valve 161, and an intermediate control valve 162.

The gas turbine 110 may compress atmospheric air to a high pressure, burn an air-fuel mixture in static pressure conditions to release thermal energy, expand high temperature combustion gas for conversion into kinetic energy, and discharge exhaust gas containing the residual energy to the atmosphere.

The gas turbine 110 may include a compressor 112, a combustor 115, and a main turbine section 113. The compressor 112 of the gas turbine 110 may suck and compress external air. The compressor 112 may supply the compressed air to the combustor 115 and also supply cooling air to a high temperature region of the gas turbine 110 that is required to be cooled. Because the sucked air is compressed in the compressor 112 through an adiabatic compression process, the pressure and temperature of the air passing through the compressor 112 increases.

The compressor 112 may be designed in a form of a centrifugal compressor or an axial compressor, and the centrifugal compressor is applied to a small-scale gas turbine, whereas a multi-stage axial compressor is applied to a large-scale gas turbine 110 to compress a large amount of air.

The combustor 115 may mix compressed air supplied from an outlet of the compressor 112 with fuel and combust the air-fuel mixture at a constant pressure to produce a high-energy combustion gas.

High temperature and high pressure combustion gas generated by the combustor 115 is supplied to the main turbine section 113. In the main turbine section 113, the combustion gas provides collision and a reaction force to a plurality of blades arranged radially around a rotary shaft of the main turbine section 113 while being subjected to adiabatic expansion so that thermal energy of the combustion gas is converted into mechanical energy that rotates the rotary shaft. A portion of the mechanical energy obtained from the main turbine section 113 is transferred to the compressor 112, and the rest is used to drive the generator 130 to produce electric power.

The combustion gas discharged from the main turbine section 113 is cooled through the HRSG 140 and purified and discharged to the outside. The HRSG 140 cools the combustion gas and generates high-temperature and high-pressure steam using the heat of the combustion gas, and delivers it to the steam turbine 120.

The steam generated in the HRSG 140 is transmitted to the steam turbine 120 through a steam feed line 181, and feed water cooled in the steam turbine 120 is transmitted to the HRSG 140 through a turbine feedwater recovery line 182.

The steam turbine 120 rotates blades using the steam generated by the HRSG 140 and transmits the rotational energy to the generator 130. The steam turbine 120 supplies the cooled steam back to the HRSG 140.

Here, although the main turbine section 113 and the steam turbine 120 are exemplified as being connected to one generator 130, it is not limited thereto. For example, the steam turbine 120 and the main turbine 113 may be disposed in parallel and connected to different generators.

The turbine feedwater recovery line 182 is connected to a condenser 121 for condensing steam, a condensate storage tank 122 for storing condensed feedwater, and a condensate pump 123 for supplying the condensed feedwater stored in the condensate storage tank 122 to the HRSG 140.

The steam flowing in the HRSG 140 may have at least two or three levels of pressure, and accordingly, the feedwater is pressurized to at least two or three levels of pressure. Here, the HRSG 140 is exemplified as having three levels of pressure.

The HRSG 140 may include a low-pressure section G1 having a relatively low pressure, a medium-pressure section G2 having a medium pressure, and a high-pressure section G3 having a relatively high pressure. The high-pressure section G3 may be disposed adjacent to an inlet of the HESG 140, through which combustion gas is introduced, and may be heated by high-temperature combustion gas. The low-pressure section G1 may be disposed adjacent to an outlet of the HESG 140, through which the combustion gas is discharged, and may be heated by low-temperature combustion gas.

The HRSG 140 accommodates a condensate preheater 141, a low-pressure evaporator 142, a medium-pressure economizer 143, a medium-pressure evaporator 144, a high-pressure economizer 145, and a high-pressure evaporator 146. In addition, superheaters may be additionally installed on upstream sides of the evaporators, respectively. The combustion gas discharged from the HRSG 140 may be discharged through a stack.

The low-pressure section G1 includes the condensate preheater 141, the low-pressure evaporator 142, and a low-pressure drum 147. The condensate stored in the condensate storage tank 122 is transferred to the condensate preheater 141 by the condensate pump 123, and the condensate preheater 141 heats the condensate through heat exchange with combustion gas. The feedwater heated in the condensate preheater 141 is transferred to a deaerator 175 to remove gas from the condensate.

Feedwater is supplied from the deaerator 175 to the low-pressure drum 147, and the low-pressure evaporator 142 is connected to the low-pressure drum 147 to heat the feedwater stored in the low-pressure drum 147 so that the feedwater is converted into steam, which may be separated from the low-pressure drum 147 and supplied to the superheater.

The medium-pressure section G2 includes the medium-pressure economizer 143, the medium-pressure evaporator 144, and a medium-pressure drum 148. The feedwater in the deaerator 175 is supplied to the medium-pressure economizer 143 by a medium-pressure pump 172, and the medium-pressure economizer 143 heats the feedwater through heat exchange with combustion gas. The feedwater heated in the medium-pressure economizer 143 is supplied to the medium-pressure drum 148, and the medium-pressure evaporator 144 is connected to the medium-pressure drum 148 to heat the feedwater stored in the medium-pressure drum 148 so that the feedwater is converted into steam, which may be separated from the medium-pressure drum 148 and supplied to the superheater.

The high-pressure section G3 includes the high-pressure economizer 145, the high-pressure evaporator 146, and a high-pressure drum 149. The feedwater in the deaerator 175 is supplied to the high-pressure economizer 145 by a high-pressure pump 173, and the high-pressure economizer 145 heats the feedwater through heat exchange with combustion gas. The feedwater heated in the high-pressure economizer 145 is supplied to the high-pressure drum 149, and the high-pressure evaporator 146 is connected to the high-pressure drum 149 to heat the feedwater stored in the high-pressure drum 149 so that the feedwater is converted into steam, which may be separated from the high-pressure drum 149 and supplied to the superheater.

The steam stored in the low-pressure drum 147, the medium-pressure drum 148, and the high-pressure drum 149 may be heated in the superheaters and supplied to each of low-pressure, medium-pressure, and high-pressure steam turbines.

The high-pressure feedwater supply pipe 153 connects the high-pressure section G3 and the fuel preheater 150 to supply high-temperature and high-pressure feedwater to the fuel preheater 150. A high-pressure valve 176 may be installed on a downstream side of the high-pressure feedwater supply pipe 153 to control the flow rate of feedwater supplied to the high-pressure feedwater supply pipe 153. The feedwater control pipe 154 connects the medium-pressure section G2 and the fuel preheater 150 to supply medium-pressure feedwater to the fuel preheater 150.

The fuel preheater 150 receives fuel from a fuel supply 117 through a fuel supply pipe 157, heats the received fuel, and supplies the heated fuel to the combustor 115. Here, the fuel may be a gas, but the present disclosure is not limited thereto.

The fuel preheater 150 includes a primary heating part 151 for primarily heating fuel and a secondary heating part 152 for secondarily heating the heated fuel. The primary heating part 151 receives fuel from the fuel supply 117, heats the fuel through heat exchange with relatively low temperature feedwater, and transmits the heated fuel to the secondary heating part 152. The secondary heating part 152 heats the fuel transmitted from the primary heating part 151 to a high temperature through heat exchange with high-pressure feedwater.

The high-pressure feedwater supply pipe 153 is connected to the secondary heating part 152 to supply high-temperature feedwater to the secondary heating part 152. The high-pressure feedwater supply pipe 153 may be connected between the high-pressure economizer 145 and the high-pressure drum 149 to supply the feedwater heated in the high-pressure economizer 145 to the secondary heating part 152. Here, the high-pressure feedwater consists of liquid other than steam, and the phase of the feedwater in the fuel preheater 150 does not change and maintains a liquid state. If the phase of the feedwater changes in the fuel preheater 150, vibration may occur due to a sudden change in pressure.

The feedwater transfer pipe 155 transfers the feedwater, which is cooled by heat exchange with fuel in the secondary heating part 152, to the primary heating part 151. The feedwater control pipe 154 is connected to the feedwater transfer pipe 155 to supply medium-pressure feedwater to the feedwater transfer pipe 155.

The feedwater control pipe 154 is connected to the downstream side of the medium-pressure pump 172 to supply the feedwater pressurized in the medium-pressure pump 172 to the feedwater transfer pipe 155. In addition, the feedwater control pipe 154 is connected between the medium-pressure pump 172 and the medium-pressure economizer 143, so that unheated feedwater in the medium-pressure section G2 is supplied to the feedwater control pipe 154 to easily control the temperature of the feedwater supplied to the primary heating part 151 to prevent overheating of the fuel.

In addition, because the feedwater control pipe 154 is connected to the downstream side of the medium-pressure pump 172, the feedwater control pipe 154 can be operated independently without affecting the medium-pressure economizer 143. Further, because the unheated feedwater in the medium-pressure section G2 is supplied to the primary heating part 151, the temperature of the feedwater is low, so that the possibility of vibration by steam is reduced. In addition, because the feedwater pressurized at high pressure in the medium-pressure pump 172 is supplied, the possibility of fuel gas leaking to the feedwater supply side is lowered due to high feedwater pressure.

When the feedwater supply pipe is connected to the downstream side of the medium-pressure economizer 143, it is difficult to control the temperature of the feedwater supplied to the primary heating part 151, so the temperature of the feedwater increases to cause vibration, and the feedwater pressure is low.

Meanwhile, the primary heating part 151 and the secondary heating part 152 may have the same capacity, and accordingly, feedwater may be supplied to the feedwater transfer pipe through the feedwater control pipe 154 only when necessary. The feedwater discharged from the secondary heating part 152 and the feedwater supplied from the feedwater control pipe 154 are mixed and supplied to the primary heating part 151.

In a connection part C1 to which the feedwater control pipe 154 and the feedwater transfer pipe 155 are connected, an upstream side may have a higher pressure than the feedwater control pipe 154, and a downstream side may have a lower pressure than the feedwater control pipe 154 or a pressure similar to that of the feedwater control pipe 154.

If the pressure on the downstream side of the feedwater transfer pipe 155 from the connection part C1 is the same as the pressure of the feedwater control pipe 154, the feedwater cannot flow from the feedwater control pipe 154 to the feedwater transfer pipe 155, and if the pressure on the downstream side of the feedwater transfer pipe 155 is higher than the pressure of the feedwater control pipe 154, the feedwater flowing through the feedwater transfer pipe 155 may be introduced into the feedwater control pipe 154. As such, the feedwater control pipe 154 is connected to the feedwater transfer pipe 155 to control the temperature and pressure of the feedwater.

On the other hand, the primary heating part 151 is connected to a feedwater return pipe 158, which is connected to the downstream side of the condensate pump 123, so that the feedwater discharged after heating fuel in the primary heating part 151 is transferred to the HRSG 140.

A first thermometer T1 for measuring the temperature of fuel discharged from the primary heating part 151 is installed on the fuel supply pipe 157 between the primary heating part 151 and the secondary heating part 152, and a second thermometer T2 for measuring the temperature of fuel discharged from the secondary heating part 152 is installed in the fuel supply pipe 157 on the downstream side of the secondary heating part 152.

In addition, the downstream control valve 161 for controlling a flow rate of feedwater discharged from the primary heating part 151 is installed on the feedwater return pipe 158. The downstream control valve 161 regulates flow rate of feedwater introduced from the feedwater control pipe 154 and the feedwater flowing through the feedwater transfer pipe 155. If an opening degree of the downstream control valve 161 decreases, excess high-pressure feedwater discharged from the secondary heating part 152 may be supplied to the medium-pressure economizer 143 through the feedwater control pipe 154.

The intermediate control valve 162 is installed on the feedwater transfer pipe 155 to regulate a flow rate of high-pressure feedwater introduced into the secondary heating part 152. The intermediate control valve 162 is disposed between the connection part P1, to which the feedwater control pipe 154 and the feedwater transfer pipe 155 are connected, and the secondary heating part 152.

Accordingly, when the opening degree of the downstream control valve 161 decreases and an opening degree of the intermediate control valve 162 is maintained in an increased state, the flow rate of feedwater flowing through the secondary heating part 152 may increase, whereas the flow rate of feedwater flowing through the primary heating part 151 may decrease. When the opening degree of the downstream control valve 161 decreases, a problem may occur in that if high-pressure feedwater cannot flow through the feedwater control pipe 154, the feedwater control pipe 154 is congested with the feedwater, thereby reducing the flow rate of the feedwater flowing through the secondary heating part 152.

On the other hand, when the opening degree of the downstream control valve 161 increases, the medium-pressure feedwater supplied through the feedwater control pipe 154 may be supplied to the primary heating part through the feedwater transfer pipe 155 together with the high-pressure feedwater discharged from the secondary heating part 152.

In addition, when the opening degree of the intermediate control valve 162 decreases, the flow rate of feedwater discharged from the secondary heating part 152 decreases, so the flow rate of the medium-pressure feedwater introduced into the feedwater transfer pipe 155 from the feedwater control pipe 154 increases. When the opening degree of the intermediate control valve 162 increases, the flow rate of feedwater discharged from the secondary heating part 152 increases, so the flow rate of the medium-pressure feedwater introduced into the feedwater transfer pipe 155 from the feedwater control pipe 154 decreases.

As described above, according to the first exemplary embodiment, the feedwater heated in the high-pressure economizer 145 is transferred to the secondary heating part 152 through the high-pressure feedwater supply pipe 153 so that the fuel can be heated to a high temperature, and the feedwater control pipe 154 is installed between the medium-pressure pump 172 and the medium-pressure economizer 143 so that the temperature of the feedwater introduced into the primary heating part 151 can be easily regulated.

Figure 4:
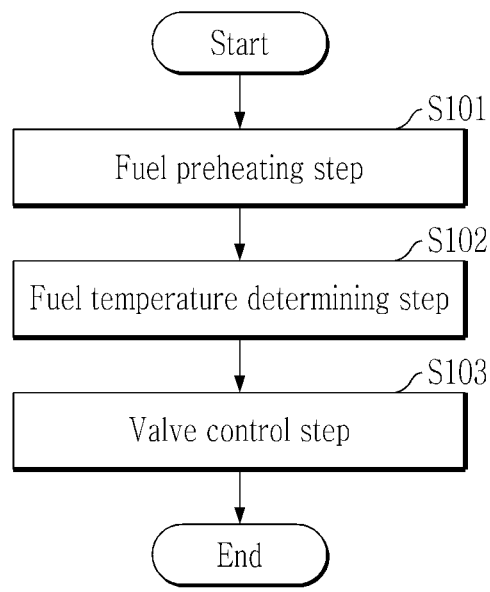
FIG. 4 is a flowchart illustrating a method of operating the combined power generation system according to the first exemplary embodiment.

Hereinafter, a method of operating the combined power generation system according to the first exemplary embodiment will be described. FIG. 4 is a flowchart illustrating a method of operating the combined power generation system according to the first exemplary embodiment.

Referring to FIGS. 3 and 4, the operating method of the combined power generation system may include a fuel preheating step (operation S101), a fuel temperature determining step (operation S102), and a valve control step (operation S103).

In the fuel preheating step (operation S101), the feedwater discharged from the secondary heating part 152 and the feedwater supplied from the medium-pressure section G2 are mixed and supplied to the primary heating part 151, and the feedwater heated in the high-pressure section G3 is supplied to the secondary heating part 152.

In the fuel preheating step (operation S101), the feedwater is supplied to the secondary heating part 152 through the high-pressure feedwater supply pipe 153 connected between the high-pressure economizer 145 and the high-pressure drum 149 in the high-pressure section G3. In addition, the feedwater discharged from the secondary heating part 152 is supplied to the primary heating part 151 through the feedwater transfer pipe 155, and the feedwater control pipe 154 which is connected between the medium-pressure pump 172 and the medium-pressure economizer 143 in the medium-pressure section G2 is connected to the feedwater transfer pipe 155 to supply the feedwater to the feedwater transfer pipe 155.

In the fuel temperature determining step (operation S102), the temperature of fuel discharged from the primary heating part 151 and the temperature of fuel discharged from the secondary heating part 152 are measured and compared with a reference temperature. The temperature of fuel is measured using the first thermometer T1 installed between the primary heating part 151 and the secondary heating part 152 and is compared with a first reference temperature, and the temperature of fuel is measured using the second thermometer T2 installed on the downstream side of the secondary heating part 152 and is compared with a second reference temperature. Here, the first reference temperature that is the comparison target of the temperature measured by the first thermometer T1 is lower than the second reference temperature that is the comparison target of the temperature measured by the second thermometer T2. The first reference temperature and the second reference temperature may be set in various ranges according to the capacity of a gas turbine, fuel type, and the like.

In the valve control step (operation S103), the temperature of fuel is controlled by regulating the downstream control valve 161 for controlling the flow rate of feedwater discharged from the primary heating part 151 and the intermediate control valve 162 for controlling the flow of feedwater between the primary heating part 151 and the secondary heating part 152.

In the valve control step (operation S103), if the temperature of fuel discharged from the primary heating part 151 is lower than the first reference temperature, the opening degree of the downstream control valve 161 is increased, and if the temperature of the fuel discharged from the primary heating part 151 is higher than the first reference temperature, the opening degree of the downstream control valve 161 is decreased.

In addition, if the temperature of the fuel discharged from the secondary heating part 152 is lower than the second reference temperature, the opening degree of the intermediate control valve 162 is increased, and if the temperature of the fuel discharged from the secondary heating part 152 is higher than the second reference temperature, the degree of opening of the intermediate control valve 162 is decreased.

As described above, it is possible to efficiently preheat fuel while preventing the fuel from being overheated with the provision of the valve control step (operation S103).

Figure 5:
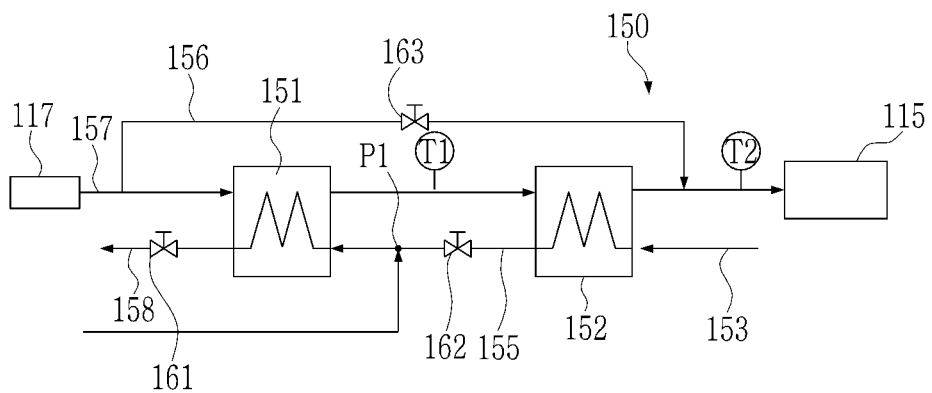
FIG. 5 is a diagram illustrating a configuration of a fuel preheater according to a second exemplary embodiment.

Hereinafter, a combined power generation system according to a second exemplary embodiment will be described. FIG. 5 is a diagram illustrating a configuration of a fuel preheater according to a second exemplary embodiment.

Here, because the combined power generation system according to the second exemplary embodiment of FIG. 5 has the same structure as the combined power generation system according to the first exemplary embodiment of FIG. 3, except for a bypass pipe 156, a redundant description of the same configuration will be omitted.

Referring to FIG. 5, the bypass pipe 156 is connected to the fuel supply pipe 157 to supply fuel to the downstream side of the secondary heating part 152 while bypassing the primary heating part 151 and the secondary heating part 152. In addition, a fuel control valve 163 is installed on the bypass pipe 156 to control a flow rate of fuel flowing through the bypass pipe 156.

The fuel control valve 163 controls the flow rate of fuel passing through the primary heating part 151 and the secondary heating part 152, thereby more easily controlling the heating temperature of the fuel.

Hereinafter, a method of operating the combined power generation system according to the second exemplary embodiment will be described.

Because the operating method of the combined power generation system according to the second exemplary embodiment is the same as the operating method of the combined power generation system according to the first exemplary embodiment, except for a valve control step, a redundant description of the same configuration will be omitted.

In the valve control step, the temperature of fuel is regulated by controlling the downstream control valve 161 for controlling the flow rate of feedwater discharged from the primary heating part 151, the intermediate control valve 162 for controlling the flow of feedwater between the primary heating part 151 and the secondary heating part 152, and the fuel control valve 163 installed on the bypass pipe 156 to supply fuel to the downstream side of the secondary heating part 152 without passing through the primary heating part 151 and the secondary heating part 152.

In the valve control step, if the temperature of the fuel discharged from the primary heating part 151 is lower than the preset first reference temperature, the opening degree of the downstream control valve 161 is increased, and if the temperature of the fuel discharged from the primary heating part 151 is higher than the first reference temperature, the opening degree of the downstream control valve 161 is decreased.

If the opening degree of the downstream control valve 161 is increased, the amount of heating feedwater flowing into the primary heating part 151 increases, so that the temperature of the fuel can be increased. In addition, if the opening degree of the downstream control valve 161 is decreased, the amount of heating feedwater flowing into the primary heating part 151 decreases, so that the temperature of the fuel can be lowered.

In addition, in the valve control step, if the temperature of the fuel discharged from the secondary heating part 152 is lower than the preset second reference temperature, the opening degree of the fuel control valve 163 is decreased, and if the fuel control valve 163 is closed, the opening degree of the intermediate control valve 162 is increased.

In addition, in the valve control step, if the temperature of the fuel discharged from the secondary heating part 152 is higher than the second reference temperature, the opening degree of the fuel control valve 163 is increased, and if the fuel control valve 163 is completely opened, the opening degree of the intermediate control valve 162 is decreased.

If the opening degree of the fuel control valve 163 is decreased, the amount of bypassed fuel is reduced, so the temperature of the fuel increases. If the opening degree of the intermediate control valve 162 is increased, the amount of feedwater introduced into the secondary heating part 152 is increased, so the temperature of the fuel may increase.

On the other hand, if the opening degree of the fuel control valve 163 is increased, the amount of bypassed fuel is increased, so the temperature of the fuel decreases. If the opening degree of the intermediate control valve 162 is reduced, the amount of feedwater introduced into the secondary heating part 152 is decreased, so the temperature of the fuel may decrease.

If the bypass pipe 156 and the fuel control valve 163 are installed as in the second exemplary embodiment, it is possible to effectively prevent overheating of fuel while minimizing the amount of feedwater used for preheating the fuel.

Figure 6:
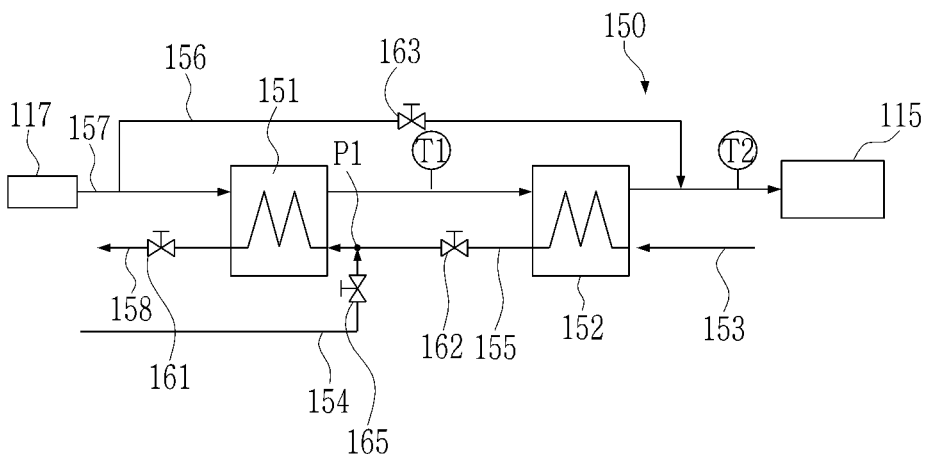
FIG. 6 is a diagram illustrating the configuration of a fuel preheater according to a third exemplary embodiment.

Hereinafter, a combined power generation system according to a third exemplary embodiment will be described. FIG. 6 is a diagram illustrating a configuration of a fuel preheater according to a third exemplary embodiment.

Because the combined power generation system according to the third exemplary embodiment of FIG. 6 has the same structure as the combined power generation system according to the second exemplary embodiment of FIG. 5, except for a medium-pressure control valve 165, a redundant description of the same configuration will be omitted.

Referring to FIG. 6, the medium-pressure control valve 165 is installed on the feedwater control pipe 154 to control a flow rate of feedwater supplied from the feedwater control pipe 154 to the feedwater transfer pipe 155. The medium-pressure control valve 165 may control an inflow of low-temperature feedwater supplied through the feedwater control pipe 154 and prevent a reverse flow of the feedwater. Accordingly, the temperature of the feedwater flowing into the primary heating part 151 through the feedwater control pipe 154 may be controlled more easily.

Meanwhile, the bypass pipe 156 is connected to the fuel supply pipe 157 to supply fuel to the downstream side of the secondary heating part 152 without passing through the primary heating part 151 and the secondary heating part 152. In addition, the fuel control valve 163 is installed on the bypass pipe 156 to control a flow rate of fuel flowing through the bypass pipe 156.

Hereinafter, a method of operating the combined power generation system according to the third exemplary embodiment will be described.

Because the operating method of the combined power generation system according to the third exemplary embodiment is the same as the operating method of the combined power generation system according to the first exemplary embodiment, except for a valve control step, a redundant description of the same configuration will be omitted.

In the valve control step, the temperature of fuel is regulated by controlling the downstream control valve 161, the intermediate control valve 162, the fuel control valve 163, and the medium-pressure control valve 165. In the valve control step, if the temperature of the fuel discharged from the primary heating part 151 is lower than the preset first reference temperature, the opening degree of the medium-pressure control valve 165 is decreased and the opening degree of the downstream control valve 161 is increased. On the other hand, if the temperature of the fuel discharged from the primary heating part 151 is higher than the first reference temperature, the opening degree of the medium-pressure control valve 165 is increased and the opening degree of the downstream control valve 161 is decreased.

If the opening degree of the medium-pressure control valve 165 is decreased, a flow rate of medium-pressure feedwater having a relatively low temperature 151 is decreased, so the temperature of the feedwater flowing into the primary heating part 151 increases, and if the opening degree of the medium-pressure control valve 165 is increased, a flow rate of medium-pressure feedwater having a relatively low temperature is increased, so the temperature of the feedwater flowing into the primary heating part 151 may decrease.

In addition, in the valve control step, if the temperature of fuel discharged from the secondary heating part 152 is lower than the preset second reference temperature, the opening degree of the fuel control valve 163 is decreased, and if the fuel control valve 163 is closed, the opening degree of the intermediate control valve 162 is increased.

In addition, in the valve control step, if the temperature of fuel discharged from the secondary heating part 152 is higher than the second reference temperature, the opening degree of the fuel control valve 163 is increased, and if the fuel control valve 163 is completely opened, the opening degree of the intermediate control valve 162 is decreased.

When the medium-pressure control valve 165 is installed as in the third exemplary embodiment, it is possible to control a flow rate of the medium-pressure water flowing into the feedwater transfer pipe 155 through the feedwater control pipe 154, thereby effectively controlling the heating temperature of the fuel.

Figure 7:
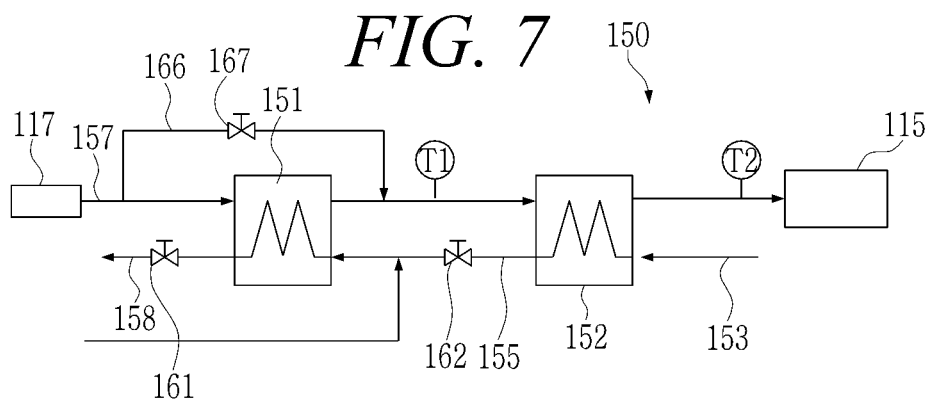
FIG. 7 is a diagram illustrating a configuration of a fuel preheater according to a fourth exemplary embodiment.

Hereinafter, a combined power generation system according to a fourth exemplary embodiment will be described. FIG. 7 is a diagram illustrating a configuration of a fuel preheater according to a fourth exemplary embodiment.

Because the combined power generation system according to the fourth exemplary embodiment of FIG. 7 has the same structure as the combined power generation system according to the first exemplary embodiment of FIG. 3, except for a bypass pipe 166 and a fuel control valve 167, a redundant description of the same configuration will be omitted.

Referring to FIG. 7, the bypass pipe 166 is connected to the fuel supply pipe 157 to supply fuel to the upstream side of the secondary heating part 152 without passing through the primary heating part 151. In addition, the fuel control valve 167 is installed on the bypass pipe 166 to control a flow rate of fuel flowing through the bypass pipe 166.

One end of the bypass pipe 166 is connected to the upstream side of the primary heating part 151, and the other end of the bypass pipe 166 is connected to the fuel supply pipe between the primary heating part 151 and the secondary heating part 152. Because the bypass pipe 166 bypasses only the primary heating part 151, the fuel flowing through the bypass pipe 166 flows into the secondary heating part 152.

Hereinafter, a method of operating the combined power generation system according to the fourth exemplary embodiment will be described.

Because the operating method of the combined power generation system according to the fourth exemplary embodiment is the same as the operating method of the combined power generation system according to the first exemplary embodiment, except for a valve control step, a redundant description of the same configuration will be omitted.

In the valve control step, the temperature of fuel is regulated by controlling the downstream control valve 161 for controlling a flow rate of feedwater discharged from the primary heating part 151, the intermediate control valve 162 for controlling a flow of feedwater between the primary heating part 151 and the secondary heating part 152, and the fuel control valve 167 installed on the bypass pipe 166 to supply fuel to the upstream side of the secondary heating part 152 without passing through the primary heating part 151.

In the valve control step, if the temperature of the fuel discharged from the primary heating part 151 is lower than the preset first reference temperature, the opening degree of the downstream control valve 161 is increased, and if the temperature of the fuel discharged from the primary heating part 151 is higher than the first reference temperature, the opening degree of the downstream control valve 161 is decreased.

In addition, in the valve control step, if the temperature of the fuel discharged from the secondary heating part 152 is lower than the preset second reference temperature, the opening degree of the fuel control valve 167 is decreased, and the fuel control valve 167 is closed, the opening degree of the intermediate control valve 162 is increased.

In addition, in the valve control step, if the temperature of the fuel discharged from the secondary heating part 152 is higher than the second reference temperature, the opening degree of the fuel control valve 167 is increased, and if the fuel control valve 163 is completely opened, the opening degree of the intermediate control valve 162 is decreased.

When the bypass pipe 166 and the fuel control valve 167 are installed as in the fourth exemplary embodiment, it is possible to effectively prevent overheating of fuel while minimizing the amount of feedwater used for preheating the fuel.

Hereinafter, a combined power generation system according to a fifth exemplary embodiment will be described.

Figure 8:
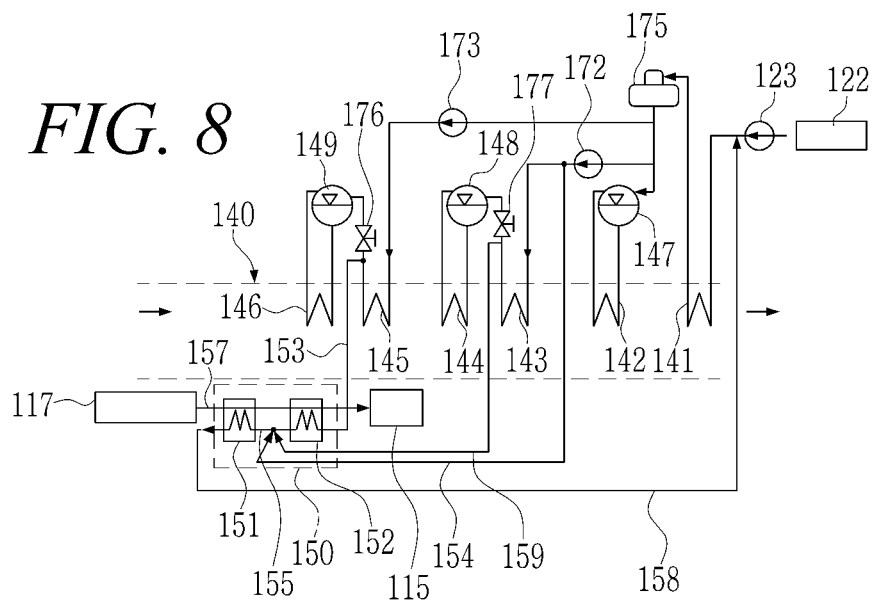
FIG. 8 is a block diagram illustrating a fuel preheater according to a fifth exemplary embodiment and a heat recovery steam generator (HRSG)
Figure 9:
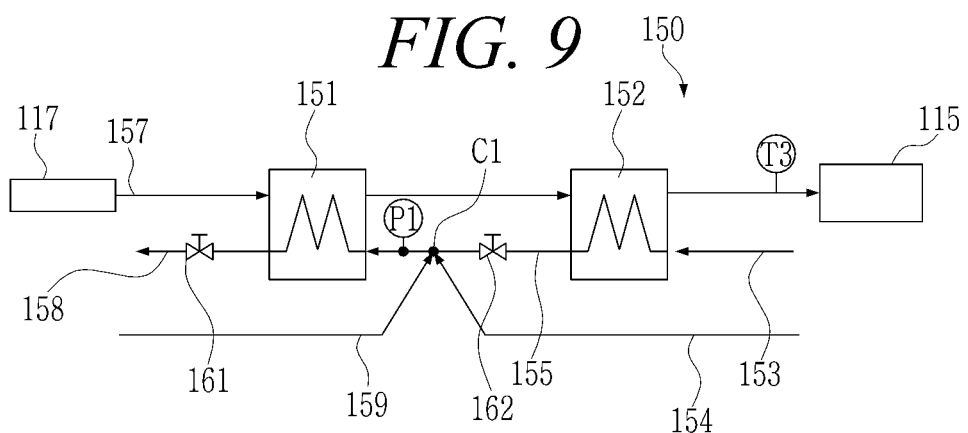
FIG. 9 is a diagram illustrating a configuration of the fuel preheater according to the fifth exemplary embodiment.

FIG. 8 is a block diagram illustrating a fuel preheater according to a fifth exemplary embodiment and a heat recovery steam generator (HRSG) and FIG. 9 is a diagram illustrating a configuration of the fuel preheater according to the fifth exemplary embodiment.

Because the combined power generation system according to the fifth exemplary embodiment of FIGS. 8 and 9 has the same structure as the combined power generation system according to the first exemplary embodiment of FIGS. 2 and 3, except for a feedwater pressure control pipe 159, a redundant description of the same configuration will be omitted.

Referring to FIGS. 8 and 9, the feedwater pressure control pipe 159 is connected between the medium-pressure economizer 143 and the medium-pressure drum 148 to supply second medium-pressure feedwater to the feedwater transfer pipe 155. The second medium-pressure feedwater has a higher temperature than the first medium-pressure feedwater. The second medium-pressure feedwater is the feedwater that is supplied from the medium-pressure pump 172 and pressurized in the medium-pressure economizer 143.

Alternatively, the feedwater pressure control pipe 159 may be directly connected to the medium-pressure drum 148, and in this case, a pressure relief valve may be installed on the feedwater pressure control pipe 159. When the feedwater pressure control pipe 159 is directly connected to the medium-pressure drum 148, an excellent pressure drop effect may be exhibited.

The feedwater from the feedwater pressure control pipe 159 can be supplied in opposite directions, and the feedwater pressure control pipe 159 controls the pressure of the feedwater transfer pipe 155 to be equal to the pressure on the upstream side of the medium-pressure drum 148.

Accordingly, the feedwater supplied through the feedwater pressure control pipe 159 and heated in the medium-pressure economizer 143 can flow into the feedwater transfer pipe 155 as well as to the downstream side of the medium-pressure economizer 143 of the medium-pressure section G2 from the feedwater transfer pipe 155 through the feedwater pressure control pipe 159.

On the other hand, because the primary heating part 151 and the secondary heating part 152 may have the same capacity, only when necessary, feedwater may be supplied to the feedwater transfer pipe 155 through the feedwater temperature control pipe 154 and the feedwater pressure control pipe 159. The feedwater supplied from the secondary heating part 152 and the feedwater supplied from the feedwater temperature control pipe 154 and the feedwater pressure control pipe 159 are mixed and supplied to the primary heating part 151.

At the connection part C1 to which the feedwater temperature control pipe 154, the feedwater transfer pipe 155, and the feedwater pressure control pipe 159 are connected, if the pressure of the feedwater transfer pipe 155 is the same as the pressure of the feedwater pressure control pipe 159, the feedwater cannot flow from the feedwater pressure control pipe 159 to the feedwater transfer pipe 155, and if the pressure of the feedwater transfer pipe 155 is higher than the pressure of the feedwater pressure control pipe 159, the feedwater flowing through the feedwater transfer pipe 155 flows into the medium-pressure section through the feedwater pressure control tube 159, and the pressure of the feedwater transfer pipe 155 may be controlled to be the same as the upstream side pressure of the medium-pressure drum 148.

As such, if the feedwater pressure control pipe 159 is connected to the feedwater transfer pipe 155, it is possible to prevent the primary heating part 151 and the secondary heating part 152 from being damaged by excessively increasing the pressure of the feedwater transfer pipe 155.

A pressure gauge P1 is installed on the feedwater transfer pipe 155 to measure the pressure of the feedwater flowing through the feedwater transfer pipe 155, and a thermometer T3 is installed in the fuel supply pipe 157 on the downstream side of the secondary heating part 152 to measure the temperature of fuel discharged from the secondary heating part 152.

Hereinafter, a combined power generation system according to a sixth exemplary embodiment will be described.

Figure 10:
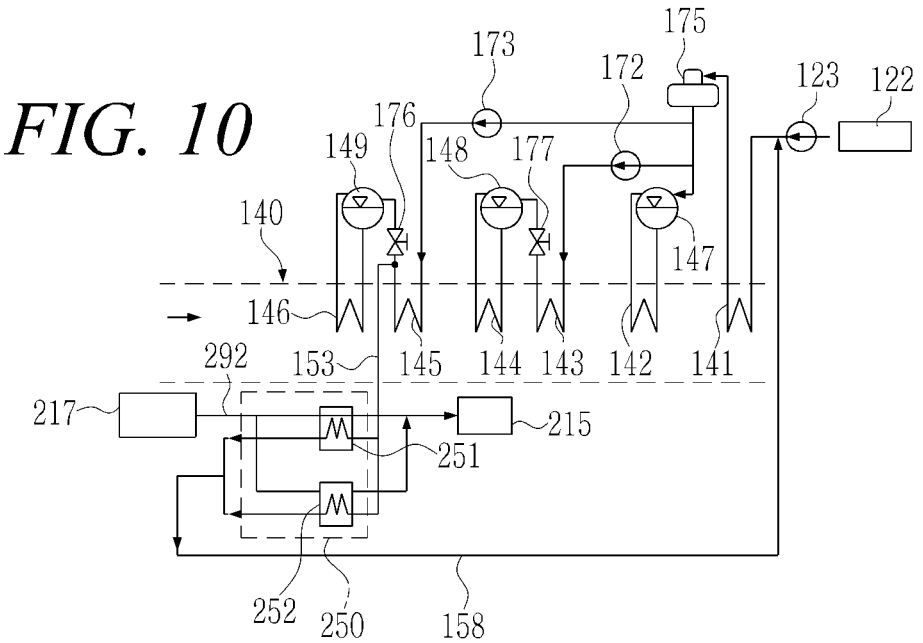
FIG. 10 is a block diagram illustrating a fuel preheater according to a sixth exemplary embodiment and a heat recovery steam generator (HRSG)
Figure 11:
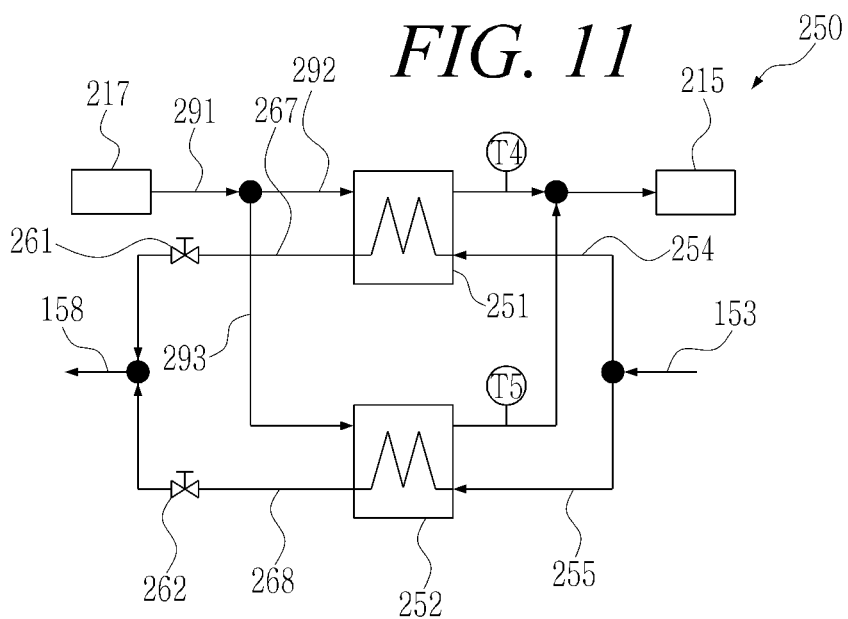
FIG. 11 is a diagram illustrating a configuration of the fuel preheater according to the sixth exemplary embodiment.

FIG. 10 is a block diagram illustrating a fuel preheater according to a sixth exemplary embodiment and a heat recovery steam generator (HRSG) and FIG. 11 is a diagram illustrating a configuration of the fuel preheater according to the sixth exemplary embodiment.

Because the combined power generation system according to the sixth exemplary embodiment of FIGS. 10 and 11 has the same structure as the combined power generation system according to the first exemplary embodiment of FIGS. 2 and 3, except for a fuel preheater 250, a redundant description of the same configuration will be omitted.

Referring to FIGS. 10 and 11, the fuel preheater 250 includes a primary heating part 251 and a secondary heating part 252 for heating fuel. The primary heating part 251 and the secondary heating part 252 are connected in parallel and have the same capacity.

The fuel preheater 250 includes a first branch pipe 254 connected to the primary heating part 251 to supply feedwater to the primary heating unit 251 and a second branch pipe 255 connected to the secondary heating part 252 to supply the feedwater to the secondary heating part 252.

The high-pressure feedwater supply pipe 153 is connected to the first branch pipe 254 and the second branch pipe 255 to supply feedwater. The high-pressure feedwater supply pipe 153 may be connected between the high-pressure economizer 145 and the high-pressure drum 149 to supply feedwater heated in the high-pressure economizer 145 to the primary heating part 251 and the secondary heating part 252.

A first discharge pipe 267 is connected to the primary heating part 251 to allow the feedwater discharged from the primary heating part 251 to flow therethrough, and a second discharge pipe 268 is connected to the secondary heating part 252 to allow the feedwater discharged from the secondary heating part 252 to flow therethrough. The first discharge pipe 267 and the second discharge pipe 268 are connected to the feedwater return pipe 158 which transfers the feedwater supplied from the first discharge pipe 267 and the second discharge pipe 268 to the HRSG 140.

A first thermometer T4 is installed on a first supply pipe 292 on the downstream side of the primary heating part 251 to measure the temperature of fuel discharged from the primary heating part 251, and a second thermometer T5 is installed on a second supply pipe 293 on the downstream side of the secondary heating part 252 to measure the temperature of the fuel discharged from the secondary heating part 252.

In addition, a first control valve 261 is installed on the first discharge pipe 267 to control a flow rate of feedwater discharged from the primary heating part 251. The first control valve 261 adjusts a flow rate of the feedwater flowing into the primary heating part 251.

Further, a second control valve 262 is installed on the second discharge pipe 268 to control a flow rate of feedwater discharged from the secondary heating part 252. The second control valve 262 adjusts a flow rate of the feedwater flowing into the secondary heating part 252.

According to the sixth exemplary embodiment, the feedwater heated in the high-pressure economizer 145 is transferred to the primary heating part 251 and the secondary heating part 252 through the high-pressure feedwater supply pipe 153, so that the fuel is heated at a high temperature. Here, the primary heating part 251 and the secondary heating part 252 are arranged in parallel, and the high-pressure feedwater is supplied to the primary heating part 251 and the secondary heating part 252 in a divided state, so that the fuel can be heated more easily.

Figure 12:
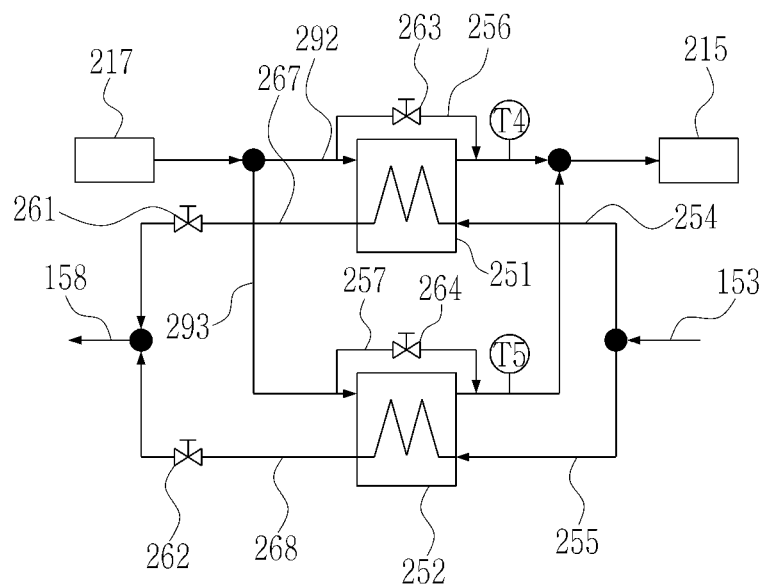
FIG. 12 is a diagram illustrating a configuration of a fuel preheater according to a seventh exemplary embodiment.

Hereinafter, a combined power generation system according to a seventh exemplary embodiment will be described. FIG. 12 is a diagram illustrating a configuration of a fuel preheater according to a seventh exemplary embodiment.

Because the combined power generation system according to the seventh exemplary embodiment of FIG. 12 has the same structure as the combined power generation system according to the sixth exemplary embodiment of FIG. 11, except for a first bypass pipe 256 and a second bypass pipe 257, a redundant description of the same configuration will be omitted.

Referring to FIG. 12, the first bypass pipe 256 is connected to the first supply pipe 292 to supply fuel to the downstream side of the primary heating part 251 by bypassing the primary heating part 251. In addition, a first fuel control valve 263 is installed on the first bypass pipe 256 to control a flow rate of fuel flowing through the first bypass pipe 256.

The second bypass pipe 257 is connected to the second supply pipe 293 to supply fuel to the downstream side of the secondary heating part 252 by bypassing the secondary heating part 252. In addition, a second fuel control valve 264 is installed on the second bypass pipe 257 to control a flow rate of fuel flowing through the second bypass pipe 257.

The first fuel control valve 263 controls a flow rate of fuel bypassing the primary heating part 251, and the second fuel control valve 264 controls a flow rate of fuel bypassing the secondary heating part 252, thereby controlling the heating temperature of the fuel more easily.

Figure 13:
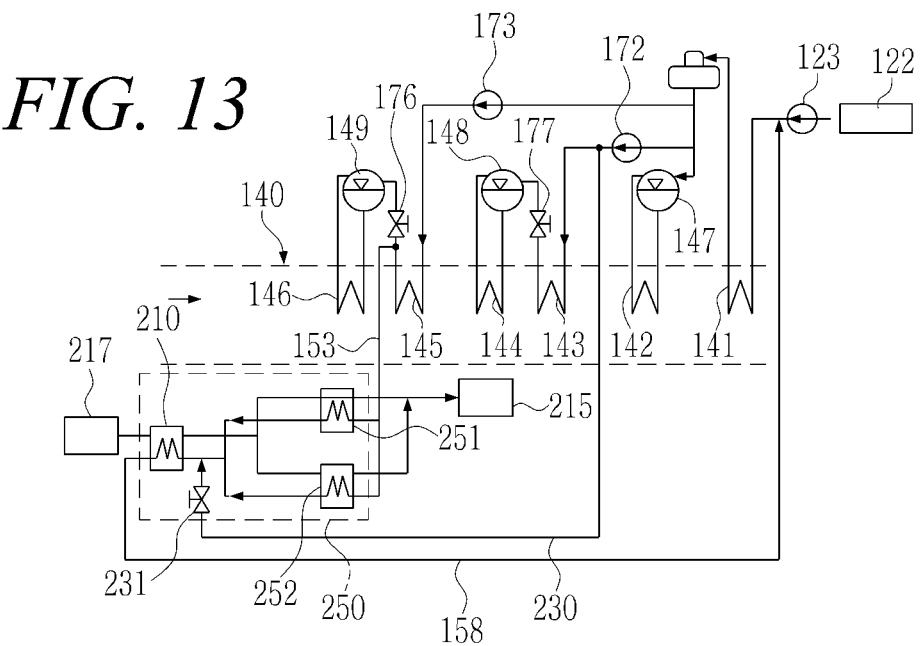
FIG. 13 is a block diagram illustrating a fuel preheater according to an eighth exemplary embodiment and a heat recovery steam generator (HRSG)

Hereinafter, a combined power generation system according to an eighth exemplary embodiment will be described. FIG. 13 is a block diagram illustrating a fuel preheater according to an eighth exemplary embodiment and a heat recovery steam generator (HRSG), and FIG. 14 is a diagram illustrating a configuration of the fuel preheater according to the eighth exemplary embodiment.

Figure 14:
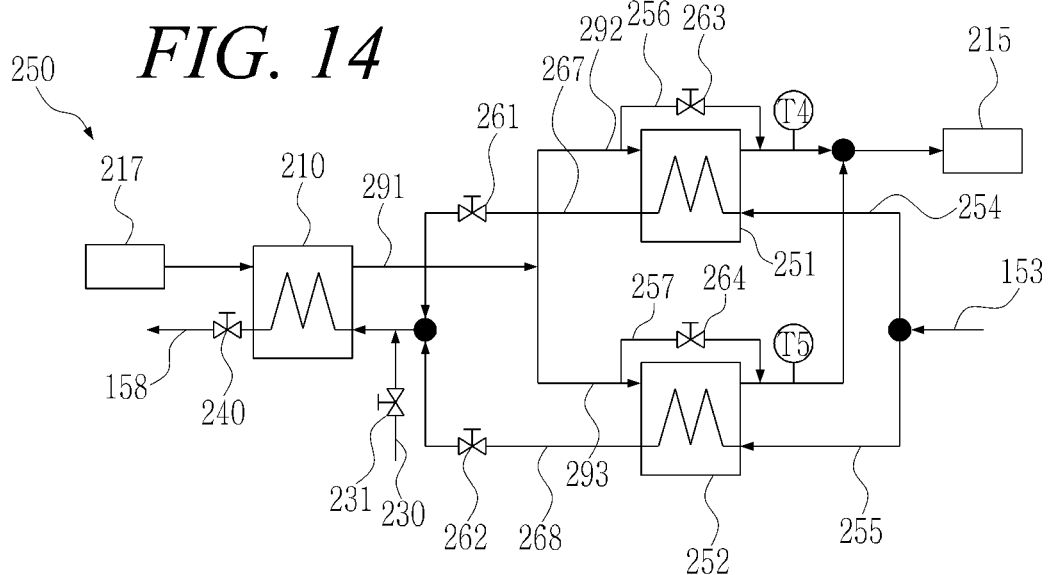
FIG. 14 is a diagram illustrating the configuration of the fuel preheater according to the eighth exemplary embodiment.

Referring to FIGS. 13 and 14, the combined power generation system according to the eighth exemplary embodiment has the same structure as the combined power generation system according to the sixth exemplary embodiment, except for a preheater 210 and a feedwater control pipe 230, so a redundant description of the same structure will be omitted.

The fuel preheater 250 further includes a preheater 210 that preheats the fuel, and the preheater 210 is installed on the feedwater return pipe 158 to preheat the fuel with the feedwater supplied from the primary heating part 251 and the secondary heating part 252. In addition, the preheater 210 divides the preheated fuel and supplies the divided fuel to the primary heating part 251 and the secondary heating part 252.

The feedwater return pipe 158 and a fuel supply pipe 291 are connected to the preheater 210, and the fuel supplied from a fuel supply 217 is heated in the preheater 210 and then is supplied to the primary heating part 251 and the secondary heating part 252. In addition, a downstream control valve 240 is installed on the downstream side of the preheater 210 from the feedwater return pipe 158 to control a flow rate of feedwater discharged from the preheater 210.

The feedwater control pipe 230 is connected to the upstream side of the preheater 210 from the feedwater return pipe 158, and the feedwater control pipe 230 connects the medium-pressure section G2 and the fuel preheater 250 to supply medium-pressure feedwater to the fuel preheater 250. A medium-pressure control valve 231 may be installed on the feedwater control pipe 230 to control a flow rate of feedwater supplied from the feedwater control pipe 230 to the preheater 210.

The feedwater control pipe 230 is connected to the downstream side of the medium-pressure pump 172 to supply the feedwater pressurized by the medium-pressure pump 172 to the feedwater return pipe 158. Because the feedwater control pipe 230 is connected between the medium-pressure pump 172 and the medium-pressure economizer 143, the unheated feedwater is supplied from the medium-pressure section G2 and the temperature of the feedwater supplied to the primary heating part 251 can be easily controlled to prevent overheating of the fuel.

In addition, because the feedwater control pipe 230 is connected to the downstream side of the medium-pressure pump 172, it can be operated independently without affecting the medium-pressure economizer 143. In addition, because the unheated feedwater in the medium-pressure section G2 is supplied to the primary heating part 251, the feedwater temperature is low, so that the possibility of vibration occurring due to steam is reduced. Further, because the feedwater pressurized at high pressure in the medium-pressure pump 172 is supplied, the feedwater pressure is high so that the possibility of fuel gas leaking to the feedwater side is lowered.

If a feedwater supply pipe is connected to the downstream side of the medium-pressure economizer 143, problems may arise in that it is difficult to control the temperature of the feedwater supplied to the primary heating part 251, the feedwater temperature is high so that vibration occurs, and the feedwater pressure is low.

The first bypass pipe 256 is connected to the first supply pipe 292 to supply fuel to the downstream side of the primary heating part 251 by bypassing the primary heating part 251. In addition, the first fuel control valve 263 is installed on the first bypass pipe 256 to control a flow rate of fuel flowing through the first bypass pipe 256.

The second bypass pipe 257 is connected to the second supply pipe 293 to supply fuel to the downstream side of the secondary heating part 252 by bypassing the secondary heating part 252. In addition, the second fuel control valve 264 is installed on the second bypass pipe 257 to control a flow rate of fuel flowing through the second bypass pipe 257.

Figure 15:
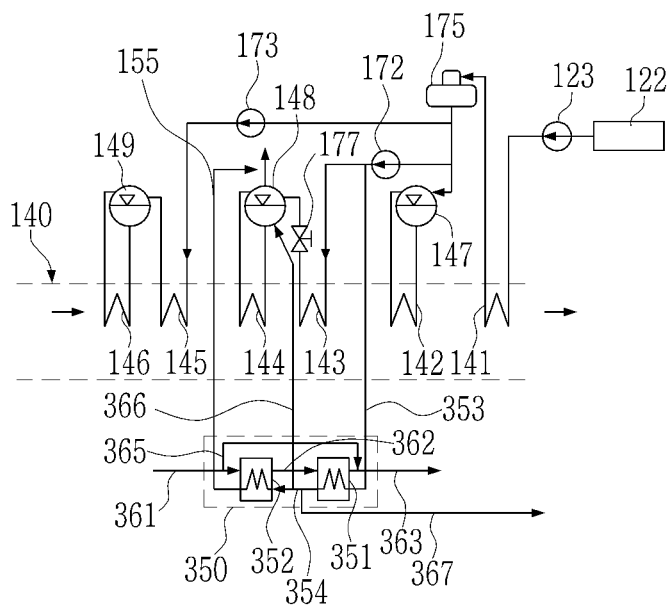
FIG. 15 is a block diagram illustrating a fuel preheater according to a ninth exemplary embodiment and a heat recovery steam generator (HRSG)

Hereinafter, a combined power generation system according to a ninth exemplary embodiment will be described. FIG. 15 is a block diagram illustrating a fuel preheater according to a ninth exemplary embodiment and a heat recovery steam generator (HRSG), and FIG. 16 is a diagram illustrating a configuration of the fuel preheater according to the ninth exemplary embodiment.

Figure 16:
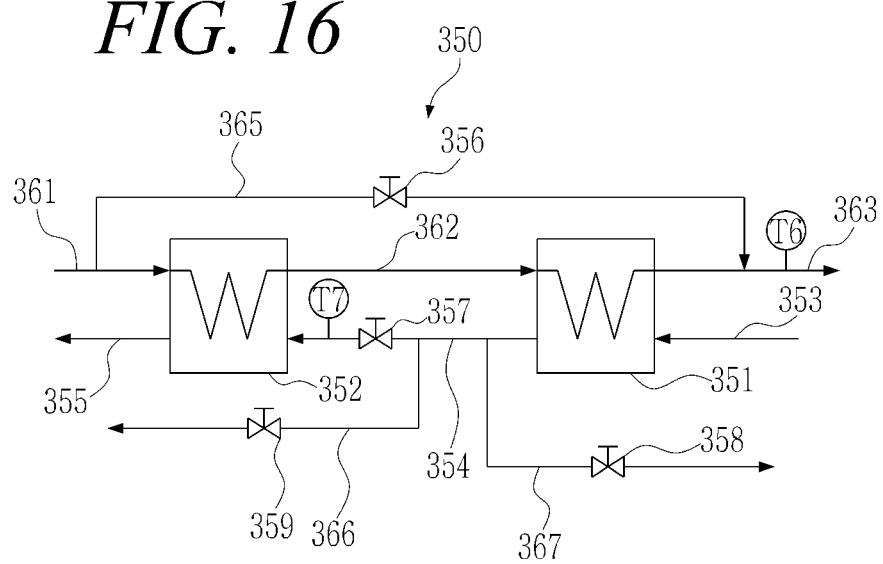
FIG. 16 is a diagram illustrating a configuration of the fuel preheater according to the ninth exemplary embodiment.

Referring to FIGS. 15 and 16, the combined power generation system may include a cooler 350. The cooler 350 may receive compressed air from a compressor through a compressed air supply pipe 361, cool the compressed air, and supply the cooled air as a heat source of a gas turbine. Here, the heat source may be any part of a combustor or a turbine.

A feedwater supply pipe 353 connects the medium-pressure section and the cooler 350 to supply feedwater to the cooler 350. A medium-pressure valve 177 may be installed on the downstream side of the medium-pressure economizer 143 to control a flow rate of feedwater supplied to the feedwater supply pipe 353.

The cooler 350 may receive compressed air from the compressor through the compressed air supply pipe 361, cool the compressed air, and supply the cooled air as a heat source of the gas turbine 110.

The cooler 350 may include a first heat exchanger 351 receiving feedwater from the feedwater supply pipe 353 and a second heat exchanger 352 receiving feedwater from the first heat exchanger 351. The first heat exchanger 351 and the second heat exchanger 352 may have the same capacity. The first heat exchanger 351 and the second heat exchanger 352 may include a plurality of heat exchange units connected in series or in parallel.

The first heat exchanger 351 is connected to the feedwater supply pipe 353 to cool air transferred from the second heat exchanger 352. The second heat exchanger 352 is connected to the compressed air supply pipe 361 to cool the air through heat exchange with relatively high temperature feedwater and transfer the air to the first heat exchanger 351.

The feedwater supply pipe 353 is connected to the first heat exchanger 351 to supply medium-pressure feedwater to the first heat exchanger 351. The feedwater supply pipe 353 is connected to the downstream side of the medium-pressure pump 172 to supply feedwater pressurized by the medium-pressure pump 172 to the first heat exchanger 351. In addition, because the feedwater supply pipe 353 is connected between the medium-pressure pump 172 and the medium-pressure economizer 143, unheated feedwater from the medium-pressure section may be supplied to efficiently cool the compressed air.

A feedwater transfer pipe 354 transfers the feedwater heated by heat exchange with compressed air in the first heat exchanger 351 to the second heat exchanger 352. In addition, an air transfer pipe 362 is installed between the first heat exchanger 351 and the second heat exchanger 352 to transfer air cooled in the second heat exchanger 352 to the first heat exchanger 351.

An intermediate return pipe 366 is connected to the feedwater transfer pipe 354 to supply a portion of the feedwater heated in the first heat exchanger 351 to the HRSG 140. The intermediate return pipe 366 is connected to the medium-pressure drum 148 to supply feedwater to the medium-pressure drum 148. When the intermediate return pipe 366 is installed as described above, the amount of feedwater supplied to the first heat exchanger 351 can be easily regulated.

Meanwhile, an intermediate discharge pipe 367 is installed on the feedwater transfer pipe 354 to supply a portion of the feedwater heated in the first heat exchanger 351 to a condenser. If the intermediate discharge pipe 367 is installed, it is possible to easily increase a flow rate supplied to the first heat exchanger 351 when the load of the gas turbine is low.

A cooling air discharge pipe 363 is connected to the first heat exchanger 351 to supply cooled air as a heat source of the gas turbine. The cooling air discharge pipe 363 may supply cooling air to a combustor liner of a combustor and main turbine blades of the gas turbine.

A steam return pipe 355 is installed on the second heat exchanger 352 to supply the feedwater heated in the second heat exchanger 352 to the HRSG 140. The steam return pipe 355 is connected to an outlet side of the medium-pressure drum 148, and the steam supplied from the steam return pipe 355 flows not into the medium-pressure drum 148, but into the steam turbine 120 after being mixed with the steam discharged from the medium-pressure drum 148.

Liquid feedwater flows into the first heat exchanger 351 and then is discharged in a liquid phase after being heated in the first heat exchanger 351. On the other hand, liquid feedwater flows into the second heat exchanger 352 and then is heated in the second heat exchanger 352 into steam, which is discharged as gaseous steam.

Figure 17:
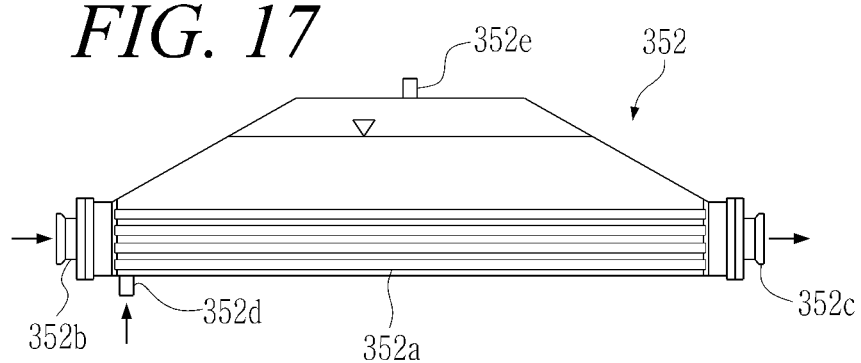
FIG. 17 is a diagram illustrating a second heat exchanger according to the ninth exemplary embodiment.

FIG. 17 is a diagram illustrating a second heat exchanger according to the ninth exemplary embodiment. Referring to FIG. 17, the second heat exchanger 352 may be configured as a kettle boiler to store and discharge vaporized steam. The second heat exchanger 352 may include a plurality of tubes 352a through which hot air flows, an air inlet 352b through which air is introduced, an air outlet 352c through which heated air is discharged, a feedwater inlet 352d through which feedwater is introduced, and a steam outlet 352e through which steam is discharged. A demister or the like may be installed on the steam outlet 352e to reduce the moisture content contained in the steam.

At this time, the plurality of tubes 352a are submerged in the feedwater so that the steam is located on the upper portion of the feedwater. In this case, a problem arises in that the heat exchange efficiency is improved only when the plurality of tubes 352a are in the feedwater and the heat exchange efficiency is significantly reduced if the plurality of tubes 352a come into contact with the steam. Accordingly, it is important to maintain a flow rate of the feedwater stored in the second heat exchanger 352 at a constant level.

As described above, if the second heat exchanger 352 is the kettle boiler, the generated steam can be stably stored and discharged to the outside while inducing efficient heat exchange between air and feedwater.

Referring to FIG. 16, an air bypass pipe 365 is installed on a compressed air flow line to connect the upstream of the second heat exchanger 352 and the downstream of the first heat exchanger 351 to allow the compressed air to the downstream of the second heat exchanger 352 while bypassing the first heat exchanger 351 and the second heat exchanger 352.

The air bypass pipe 365 is connected to the compressed air supply pipe 361 and the cooling air discharge pipe 363 so that the compressed air bypasses the first heat exchanger 351 and the second heat exchanger 352. In addition, an air control valve 356 is installed on the air bypass pipe 365 to control a flow rate of air flowing through the air bypass pipe 365.

The air control valve 356 may control a flow rate of air bypassing the first heat exchanger 351 and the second heat exchanger 352, thereby controlling the air temperature more easily.

A thermometer T6 is installed on the cooling air discharge pipe 363 on the downstream side, through which the air is discharged from the first heat exchanger 351, to measure the temperature of the cooled air. In addition, a thermometer T7 is installed on the upstream side of the second heat exchanger 352 to measure the temperature of the feedwater flowing into the second heat exchanger 352.

In addition, an intermediate control valve 357 is installed on the feedwater transfer pipe 354 to control a flow rate of the feedwater flowing into the second heat exchanger 352. The intermediate control valve 357 controls the feedwater level in the second heat exchanger 352 to be maintained at a preset level.

A return control valve 359 is installed on the intermediate return pipe 366 to control a flow rate of feedwater returned to the medium-pressure drum 148 through the intermediate return pipe 366. The return control valve 359 may control the temperature of the cooling air.

A discharge control valve 358 is installed on the intermediate discharge pipe 367 to control a flow rate of feedwater discharged to the condenser through the intermediate discharge pipe 367. The discharge control valve 358 controls the amount of excess feedwater flowing to the condenser according to the operating state of the gas turbine.

While exemplary embodiments have been described with reference to the accompanying drawings, it will be apparent to those skilled in the art that various modifications in form and details can be made therein without departing from the spirit and scope as set forth in the appended claims. Therefore, the description of the exemplary embodiments should be construed in a descriptive sense and not to limit the scope of the claims, and many alternatives, modifications, and variations will be apparent to those skilled in the art.

What is claimed is:

1. A combined power generation system comprising:
   a gas turbine configured to combust fuel to generate a rotational force;
   a heat recovery steam generator (HRSG) configured to heat feedwater using combustion gas discharged from the gas turbine and include a high-pressure section, a medium-pressure section, and a low-pressure section with different pressure levels;
   a fuel preheater configured to heat fuel supplied to the gas turbine and include a primary heating part and a secondary heating part;
   a high-pressure feedwater supply pipe connected to the high-pressure section to supply high-pressure feedwater to the fuel preheater;
   a feedwater transfer pipe connecting the secondary heating part and the primary beating part to supply feedwater discharged from the secondary heating part to the primary beating part; and
   a first feedwater control pipe connected to supply first medium-pressure feedwater to the feedwater transfer pipe, and
   wherein the medium-pressure section includes a medium-pressure pump pressurizing and supplying the feedwater, a medium-pressure economizer receiving the feedwater from the medium-pressure pump and heating the received feedwater,
   wherein the first feedwater control pipe is connected between the medium pressure pump and the medium-pressure economizer of the medium-pressure section,
   wherein the high-pressure feedwater consists of liquid, and a phase of the high-pressure feedwater in the fuel preheater does not change and maintains a liquid state.

2. The combined power generation system according to claim 1, wherein the high-pressure feedwater supply pipe is connected to the secondary heating part to supply the high-pressure feedwater to the secondary heating part.

3. The combined power generation system according to claim 1, further comprising:
   an intermediate control valve installed between the primary heating part and the secondary heating part to control a flow rate of high-pressure feedwater flowing into the secondary heating part.

4. The combined power generation system according to claim 3, wherein a medium-pressure control valve is installed on the first feedwater control pipe to control a flow rate of feedwater supplied from the first feedwater control pipe to the feedwater transfer pipe.

5. The combined power generation system according to claim 1, further comprising:
   a bypass pipe connecting an upstream side of the primary heating part and a downstream side of the secondary heating part to supply fuel to the downstream side of the secondary heating part while bypassing the primary heating part and the secondary heating part.

6. The combined power generation system according to claim 1, further comprising:
   a bypass pipe connecting an upstream side of the primary heating part and an upstream side of the secondary heating part to supply fuel to the secondary heating part while bypassing the primary heating part.

7. The combined power generation system according to claim 1, further comprising:
   a second feedwater control pipe connected to a downstream side of the medium-pressure economizer of the medium-pressure section to supply second medium-pressure feedwater to the feedwater transfer pipe, the second medium-pressure feedwater having a higher temperature than that of the first medium-pressure feedwater.

8. The combined power generation system according to claim 7, wherein the medium-pressure section further includes a medium-pressure drum storing the feedwater heated in the medium-pressure economizer.

9. The combined power generation system according to claim 8, wherein the second feedwater control pipe is connected between the medium-pressure economizer and the medium-pressure drum to receive the feedwater heated in the medium-pressure economizer.

10. A combined power generation system comprising:
    a gas turbine configured to combust fuel to generate a rotational force;
    a heat recovery steam generator (HRSG) configured to heat feedwater using combustion gas discharged from the gas turbine and include a high-pressure section, a medium-pressure section, and a low-pressure section with different pressure levels;
    a fuel preheater configured to heat fuel supplied to the gas turbine and include a primary heating part and a secondary heating part; and
    a high-pressure feedwater supply pipe connected to the high-pressure section to supply high-pressure feedwater to the fuel preheater;
    a feedwater transfer pipe connecting the secondary heating part and the primary heating part to supply the feedwater discharged from the secondary heating part to the primary heating part;
    a feedwater temperature control pipe connected to a downstream side of a medium-pressure pump of the medium-pressure section to supply first medium-pressure feedwater to the feedwater transfer pipe; and
    a feedwater pressure control pipe connected to the medium-pressure section to supply second medium-pressure feedwater to the feedwater transfer pipe, the second medium-pressure feedwater having a higher temperature than that of the first medium-pressure feedwater,
    wherein the high-pressure feedwater supply pipe is connected to the secondary heating part to supply the high-pressure feedwater to the secondary heating part,
    wherein the medium-pressure section includes the medium-pressure pump pressurizing and supplying the feedwater, a medium-pressure economizer receiving the feedwater from the medium-pressure pump and heating the received feedwater, and a medium-pressure drum storing the feedwater heated in the medium-pressure economizer,
    wherein the feedwater temperature control pipe is connected between the medium-pressure pump and the medium-pressure economizer to receive the feedwater from the medium-pressure pump,
    wherein the feedwater pressure control pipe is connected between the medium-pressure economizer and the medium-pressure drum to receive the feedwater heated in the medium-pressure economizer,
    wherein the feedwater of the feedwater pressure control pipe is configured to flow either in a direction toward the medium-pressure section or in a direction toward the feedwater transfer pipe, such that a pressure of the feedwater transfer pipe and a pressure of the upstream side of the medium-pressure drum are controlled to be equal to each other by the feedwater pressure control pipe.

11. A combined power generation system comprising:
a gas turbine configured to combust fuel to generate a rotational force;
a heat recovery steam generator (HRSG) configured to heat feedwater using combustion gas discharged from the gas turbine and include a high-pressure section, a medium-pressure section, and a low-pressure section with different pressure levels;
a fuel preheater configured to heat fuel supplied to the gas turbine and include a primary heating part and a secondary heating part; and
a high-pressure feedwater supply pipe connected to the high-pressure section to supply high-pressure feedwater to the fuel preheater,
wherein the primary heating part and the secondary heating part are disposed in parallel such that fuel in the primary heating part does not flow to the secondary heating part and fuel in the secondary heating part does not flow to the primary heating part,
wherein the fuel preheater further comprises a preheater connected to a feedwater return pipe to receive the feedwater discharged from the primary heating part and the secondary heating part disposed in parallel, the fuel heated in the preheater being divided and supplied to the primary heating part and the secondary heating part disposed in parallel.

12. The combined power generation system according to claim 11, further comprising:
a first branch pipe connected to the high-pressure feedwater supply pipe to supply the feedwater to the primary heating part; and
a second branch pipe connected to the high-pressure feedwater supply pipe to supply the feedwater to the secondary heating part.

13. The combined power generation system according to claim 12, further comprising:
a first bypass pipe connecting an upstream side of the primary heating part and a downstream side of the primary heating part to supply fuel while bypassing the primary heating part; and
a first fuel control valve controlling a flow rate of the fuel flowing through the first bypass pipe.

14. The combined power generation system according to claim 12, further comprising:
a second bypass pipe connecting an upstream side of the secondary heating part and a downstream side of the secondary heating part to supply fuel while bypassing the secondary heating part; and
a second fuel control valve controlling a flow rate of the fuel flowing through the second bypass pipe.

15. The combined power generation system according to claim 12, further comprising a feedwater control pipe to supply the feedwater from the medium-pressure section to the preheater.

16. The combined power generation system according to claim 1, further comprising a downstream control valve installed on a feedwater return pipe receiving feedwater discharged from the primary heating part, to control a flow rate of feedwater discharged from the primary heating part.

17. The combined power generation system according to claim 11, further comprising:
a first downstream control valve installed on a first discharge pipe receiving feedwater discharged from the primary heating part, to control a flow rate of feedwater discharge from the primary heating part; and
a second downstream control valve installed on a second discharge pipe receiving feedwater discharged from the secondary heating part, to control a flow rate of feedwater discharged from the secondary heating part.

* * * * *